US012649671B2

(12) United States Patent

Bobb et al.

(10) Patent No.: US 12,649,671 B2

(45) Date of Patent: Jun. 9, 2026

(54) SYSTEM FOR CAPTURING AND RECYCLING WASHING COMPONENTS

(71) Applicant: Darbo Auto Wash LLC, Hyattsville, MD (US)

(72) Inventors: Daryle Bobb, Rockville, MD (US); Dennis Toibero, Laurel, MD (US); John Zaniker, Severna Park, MD (US)

(73) Assignee: Darbo Auto Wash LLC, Rockville, MD (US)

( * ) Notice: Subject to any disclaimer, the term of this patent is extended or adjusted under 35 U.S.C. 154(b) by 750 days.

(21) Appl. No.: 17/787,224

(22) PCT Filed: Dec. 18, 2020

(86) PCT No.: PCT/US2020/066092

§ 371 (c)(1),
(2) Date: Jun. 17, 2022

(87) PCT Pub. No.: WO2021/127492

PCT Pub. Date: Jun. 24, 2021

(65) Prior Publication Data

US 2023/0019953 A1 Jan. 19, 2023

Related U.S. Application Data

(60) Provisional application No. 62/951,845, filed on Dec. 20, 2019.

(51) Int. Cl.
*C02F 1/00* (2023.01)
*A01K 13/00* (2006.01)
(Continued)

(52) U.S. Cl.
CPC ............ *C02F 1/004* (2013.01); *A01K 13/001* (2013.01); *B08B 3/14* (2013.01); *B08B 13/00* (2013.01);
(Continued)

(58) Field of Classification Search
CPC .. B08B 3/14; B08B 13/00; B60S 3/04; A01K 13/001; C02F 2001/007; C02F 2103/44;
(Continued)

(56) References Cited

U.S. PATENT DOCUMENTS 4,300,924 A 11/1981 Coyle
5,026,488 A 6/1991 Mesheau
(Continued)

FOREIGN PATENT DOCUMENTS

EP 0262985 A2 4/1988
EP 0363751 A2 4/1990
(Continued)

OTHER PUBLICATIONS

International Search Report and Written Opinion mailed May 7, 2021, directed to International Application No. PCT/US2020/066092; 23 pages.

*Primary Examiner* — Benjamin M Kurtz

(74) *Attorney, Agent, or Firm* — Michele V. Frank; Venable LLP

(57) ABSTRACT

A system and method of capturing washing agents and washed item particulates. The washing agents and washed item particulates are contained in a pad placed over an existing surface where they are captured. The washing agents and washed items are sent to a central depository for recycling and separation for clean disposal. The depository allows for re-usable portions of the washing agents to be re-used as part of the system while unusable residuals are separated for proper treatment or disposal.

21 Claims, 9 Drawing Sheets

(51) Int. Cl.

| | |
|---|---|
| *B08B 3/14* | (2006.01) |
| *B08B 13/00* | (2006.01) |
| *B60S 3/04* | (2006.01) |
| *C02F 103/44* | (2006.01) |

(52) U.S. Cl.
CPC ........... *B60S 3/04* (2013.01); *C02F 2001/007* (2013.01); *C02F 2103/44* (2013.01); *C02F 2201/005* (2013.01); *C02F 2201/007* (2013.01)

(58) Field of Classification Search
CPC .............. B01D 21/003; B01D 21/0033; B01D 21/0042
See application file for complete search history.

(56) References Cited

U.S. PATENT DOCUMENTS

| | | | |
|---|---|---|---|
| 5,374,352 | A | 12/1994 | Pattee |
| 5,423,339 | A | 6/1995 | Latimer |
| 5,498,329 | A | 3/1996 | Lamminen et al. |
| 5,597,001 | A | 1/1997 | Rasmussen et al. |
| 6,655,396 | B2 | 12/2003 | Krenzel |
| 7,111,631 | B1 | 9/2006 | Breeze |
| 8,701,687 | B2 | 4/2014 | MacKinnon |
| 2002/0127075 | A1 | 9/2002 | Wassick |
| 2005/0066997 | A1 | 3/2005 | Watford |
| 2005/0139243 | A1 | 6/2005 | Hay et al. |
| 2007/0000526 | A1 | 1/2007 | Dieziger |
| 2009/0188535 | A1* | 7/2009 | Taylor ...................... B60S 3/04<br>137/314 |
| 2010/0307984 | A1* | 12/2010 | Mortensen ................ C02F 1/78<br>210/639 |
| 2012/0253973 | A1 | 10/2012 | Harter |
| 2014/0202505 | A1 | 7/2014 | Cotton et al. |
| 2015/0059812 | A1 | 3/2015 | Petter et al. |
| 2015/0085438 | A1 | 3/2015 | Lehman |
| 2020/0108804 | A1 | 4/2020 | Parr |

FOREIGN PATENT DOCUMENTS

| | | | |
|---|---|---|---|
| EP | 0509081 | A1 | 10/1992 |
| EP | 0679834 | A1 | 11/1995 |
| WO | 1992007740 | A1 | 5/1992 |
| WO | 1993001958 | A1 | 2/1993 |
| WO | 1996001157 | A1 | 1/1996 |
| WO | 1996009945 | A1 | 4/1996 |
| WO | 2001042066 | A1 | 6/2001 |
| WO | 2003099473 | A1 | 12/2003 |
| WO | 2005028267 | A1 | 3/2005 |
| WO | 2017039087 | A1 | 3/2017 |
| WO | 2020075077 | A1 | 4/2020 |

* cited by examiner

| Sump float full ? | | |
| YES | NO | |

Pump off return valve closed

Reclaim tank full ? → NO → Pump on return valve to tank

Reclaim tank full ? → YES → Pump off return valve to discharge

Sump Controls Table

| Sensors | | Actions | |
|---|---|---|---|
| Sump Level | Reclaim Tank Level | Sump Pump | Return Valve |
| Empty | Any | OFF | Closed |
| Full | Available | ON | To Tank |
| Full | Full | ON | To Discharge |

| Reclamation Tank Fill Controls Table | |
|---|---|
| Tank Level | Reclamation Tank Fill Valve |
| Low | Clean Water Supply |
| Medium | Used Wash Agent Return |
| High (Full) | CLOSED |

| Cleaning System Wash Agent Controls Table | |
| --- | --- |
| Wash Select | Water Source |
| Pressure Wash | Reclaimed |
| Pressure Soap | Reclaimed |
| Foam Brush | Reclaimed |
| Rinse | Fresh |
| Wax | Fresh |
| Spot Free | Fresh |

SYSTEM FOR CAPTURING AND RECYCLING WASHING COMPONENTS

CROSS-REFERENCE TO RELATED APPLICATIONS

The present application is a National Phase of International Application No. PCT/US2020/066092, filed Dec. 18, 2020, which claims priority to U.S. Provisional Application No. 62/951,845, filed Dec. 20, 2019, the entire contents of each of which are hereby incorporated by reference in their entireties.

TECHNICAL FIELD

The present relates to the capture and control of wash agents such that a washing system can be made available to locations in an ecological and economical friendly product.

BACKGROUND

Washing items, such as vehicles, equipment, and pets, is typically done either using the traditional hose and bucket or in some cases at a facility built specifically to capture run off typically requiring capital intensive infrastructures. In many cases the run off of washing agents such as water, detergents, other wash agents and dirt/oil from the washed item is allowed to run into our ground water system or is captured and sent to our wastewater treatment facilities creating a costly environmental clean up.

For example, many owners of automobiles wash their vehicles at home using a hose for water supply and a bucket to contain washing detergents. It is normal for home washers to use nearly 100 gallons of water and many non-environment friendly agents for a single vehicle wash. The contaminants from the vehicle in the form of dirt, salts, grease/oil, and other particulates are added to the run off and sent to our ground water system. In many cases, these owners live in large multi-housing or townhome communities.

Businesses with large equipment often wash their equipment in their yards using similar methods as homeowners, creating large amounts of possible toxic exposure to our ground water system. Most commercial car washes prohibit businesses from using their establishment to wash their vehicles and equipment.

Marinas with haul out services also are a big source of vehicle cleaning. Boat owners will wash down their boats after pulling them out to remove any grime, algae, and other contaminants. In some severe cases, they may also dump their on board holding tanks as part of the cleaning process. Power boaters may leave behind oils or fuel traces as well. All of these materials would eventually find their way to our ground water systems or water treatment facilities. Another example is pet owners that wash their pets, dogs or other animals in back yards and similar areas with run off uncontained.

There are also a number of commercial cleaning businesses such as car washes that use vast amounts of fresh water and add numerous cleaning agents to our wastewater treatment facilities. Most jurisdictions will require car washes to build expensive drainage networks and in some cases reclamation systems. The build out for these drainage networks can be extremely costly, making this option impossible for smaller volume locations such as apartment complexes, townhome communities, and businesses. Additionally, many jurisdictions have high "tap fees" and other permitting and licensing costs for traditional cleaning businesses that make the barriers to open these operations very high.

Typical commercial cleaning operations such as car washes are often great distances from users making their services difficult to use which increases users washing using non-run off capturing methods such as hose and bucket. Multi-housing communities often provide car cleaning locations on their properties in order to compete with other local properties due to the inconvenience of finding a car wash that will contain the run off of wash agents. Many of these wash sites fail to conform with environmental regulations for the capture of used wash agents creating large amounts of discharge into local grounds harming our environment.

A need exists to for a system designed to overcome the obstacles of current designs in a small factor system designed to wash items in an energy efficient and environmentally friendly way.

BRIEF SUMMARY

According to an embodiment, a washing system may include a washing pad; a reclamation tank having a baffle; and a cleaning system and a cleaning apparatus in fluid communication with the cleaning system. The washing pad and the baffle may be configured to filter out waste agents from a flow of used wash agents. The reclamation tank may be configured to transfer waste agents from the flow of used wash agents to a disposal site and to transfer reusable agents from the flow of used wash agents to an inlet on the cleaning system. The washing system may be portable and modular.

According to an embodiment, the washing pad further comprises: an upper washing surface formed of one or more surface grates supported by one or more support members; one or more ramps adapted to allow access to the upper washing surface; a contained area bounded by a lower washing pad base, side containment walls, and the one or more ramps; one or more obstructions configured to filter out particles; and a wash agent capture point configured to transfer the flow of used wash agents from the washing pad to the reclamation tank.

According to an embodiment, the washing pad further comprises: a washing pad inlet configured to allow flow of new wash agents through the washing pad; and a washing pad outlet configured to allow flow of used wash agents from the washing pad to the reclamation tank.

According to an embodiment, the reclamation tank further comprises: a baffle having one or more high side access ports and one or more low side access ports; a first compartment; a second compartment separated from the first compartment with the baffle; and a plurality of outlets, the plurality of outlets configured to discharge separated flows from the flow of used wash agents.

According to an embodiment, the baffle is configured to filter lightweight particulates through the one or more high side access ports and heavyweight particulates through the one or more low side access ports.

According to an embodiment, the reclamation tank further comprises: a reclamation tank inlet configured to supply a clean water flow and the flow of used wash agents to the first compartment; a first reclamation tank outlet configured to allow a flow of high side wash agents for disposal; a second reclamation tank outlet configured to allow a flow of low side wash agents for disposal; and a third reclamation tank outlet configured to allow a flow of reusable wash agents from the second compartment to the cleaning system.

According to an embodiment, the washing system further comprises a secondary filtration system configured to purify the recycled water to remove impurities.

According to an embodiment, the washing system further comprises a buffer tank placed after the secondary filtration system to allow for holding of purified water for reuse by the cleaning system.

According to an embodiment, the cleaning system further comprises: a user interface having a payment module and a system display.

According to an embodiment, wherein the cleaning system further comprises: a cleaning system inlet configured to allow flow of new wash agents to the cleaning apparatus; and a cleaning system outlet formed in the cleaning apparatus and configured to discharge the flow of new wash agents.

According to an embodiment, the flow of new wash agents comprises a flow of fresh water, new cleaning agents, and reused cleaning agents from the reclamation tank.

According to an embodiment, the cleaning apparatus further comprises a spray wand, a brush, a foaming brush, a squeegee, other cleaning device or combinations thereof.

According to an embodiment, one or more control valves configured to control flow between the washing pad, the reclamation tank, and the cleaning system.

According to an embodiment, the reusable agents include water.

According to an embodiment, a method of recycling cleaning agents may include providing a first flow from a cleaning system to a cleaning apparatus, the first flow comprising new cleaning agents and fresh water; discharging the first flow from the cleaning apparatus onto an object to be cleaned; collecting the first flow in a washing pad; discharging a second flow from the washing pad, the second flow comprising the first flow after washing the object to be cleaned; providing the second flow to a reclamation tank; filtering the second flow in the reclamation tank to produce a third flow; discharging the third flow form the reclamation tank; and reusing the third flow from the reclamation tank in the cleaning system.

According to an embodiment, the first flow further comprises the third flow.

According to an embodiment, the washing pad removes heavy particulates such that the second flow provided to the reclamation tank is a filtered flow.

According to an embodiment, the second flow is filtered into the third flow, a fourth flow, and a fifth flow, wherein the fourth flow comprises high side waste agents and the fifth flow comprises low side waste agents, and wherein the high side waste agents are of lower density than the low side waste agents.

According to an embodiment, the method includes a first pump to move the second flow from the washing pad to the reclamation tank and a second pump to move the third flow from the reclamation tank to the cleaning system.

According to an embodiment, the method includes one or more control valves configured to control flow between the washing pad, the reclamation tank, and the cleaning system.

DETAILED DESCRIPTION

The present disclosure relates to a cleaning system for reclaiming washing agents for disposal, re-use, or combinations thereof. The present disclosure relates to convenient access to a cleaning system that allows authorized users the ability to clean their items whereby the clean agents are contained and recaptured in an environmentally friendly method. The captured cleaning agents are managed to allow for re-use of a portion of the agents while the rest are evacuated in a controlled environmentally safe manor. The system is built of small modular components for simplicity and does not require significant infrastructure support.

Figure 1:
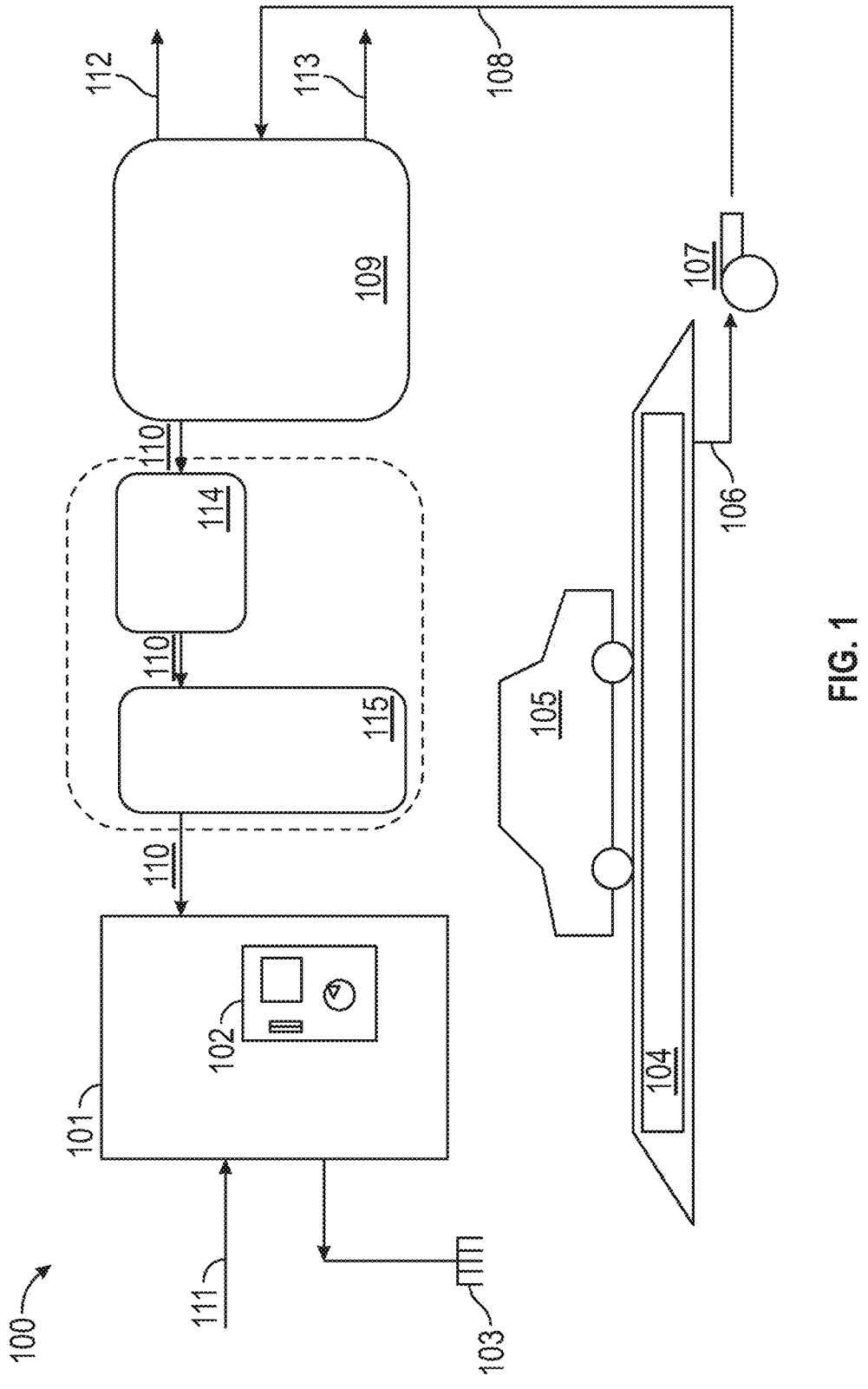
FIG. 1 shows a washing system, according to an embodiment.

Referring to FIG. 1, a washing system 100 is shown. The washing system 100 may be a small form factor portable wash system that is modular in design. The washing system 100 may be constructed from components that are designed to allow for installation on a surface. The surface may be any hard surface, a flat surface, a generally planar surface, or combinations thereof. During operation, a user may approach a main cleaning system 101. The user may make a purchase at a user interface terminal 102 of the main cleaning system 101. Users may make a purchase at the user interface terminal 102 via credit card, cash, coin, token, mobile payment, digital wallets, or combinations thereof. Alternatively, or additionally, to the user interface terminal 102, the user may make a purchase via a mobile a mobile application. Users using the mobile application may be able to make payments, receive special discounts, and/or be given pre-purchased uses that may be offered to residents as part of an incentive program.

An item or object 105 may be placed on a washing pad 104. A cleaning apparatus 103 may be selected to use at the cleaning system 101. The cleaning apparatus 103 may provide wash agents used for cleaning of the object 105. The cleaning apparatus 103 may be, for example, a spray wand, a brush, a foaming brush, a squeegee, or combinations thereof. More than one cleaning apparatus 103 may be provided with the cleaning system 101. More than one cleaning apparatus 103 may be employed at the same time or sequentially during the cleaning of object 105. The wash agent may be, for example, water, cleaning detergents, spot free rinses, waxes, or combinations thereof. Fresh water for wash cycles that require clean water may be sourced from a fresh agent add line 111. The fresh agent add line 111 may provide water and/or the wash agent. More than one fresh agent add line 111 may be provided. Wash agents may be stored in refillable and/or replaceable containers within the cleaning system 101. The object 105 may be an object to be cleaned. The object 105 may be an automobile, truck, pet, equipment, or any other object. Although a single object 105 is shown in FIG. 1 as being cleaned, more objects may be provided for simultaneous or sequential cleaning.

With continued reference to FIG. 1, the washing pad 104 may be constructed of small components and may be built to the requirements defined by the location, the size of the object 105, the weight of the object 105 to be washed, or any combination thereof. The washing pad 104 may collect all wash agent discharge from the cleaning apparatus 103 and the cleaning system 101. That is, the wash agent may be dispersed from the cleaning apparatus 103 and/or the cleaning system 101 onto the washing pad 104. Other agents disbursed (e.g., by the user, by a bucket, etc.) may also be dispersed onto the washing pad 104. The washing pad 104 may thus collect the wash agents, preventing them from being discharged to the environment. The wash agents may be removed from the washing pad 104 at the wash agent capture point 106. After collection at the wash agent capture point 106, the wash agents may travel to reclamation tank 109 via a flow control device 107 and agent return line 108. The flow control device 107 may be one or more pumps and/or one or more gravity drains.

The reclamation tank 109 may collect and manage the wash agents. That is, the discharged wash agents (e.g., comprising of water, cleaning detergents, dirt, oils, and other compounds removed from the washed object 105) may be managed by the reclamation tank 109 with reusable agents returned to the cleaning system 101 via the wash agent recycled return line 110. In some cases, a secondary wash agent treatment 114 can be added to the wash agent recycled return line 110 to further purify captured wash agents. A recycled agent buffer tank 115 can also be added to store treated recycled wash agents for use as demanded by the cleaning system 101. Wash agents that may not be reused may be removed via the agent disposal line 112 for proper disposal. The secondary wash agent treatment 114 and/or the recycled agent buffer tank 115 may be omitted.

Figures 2A, 2B:
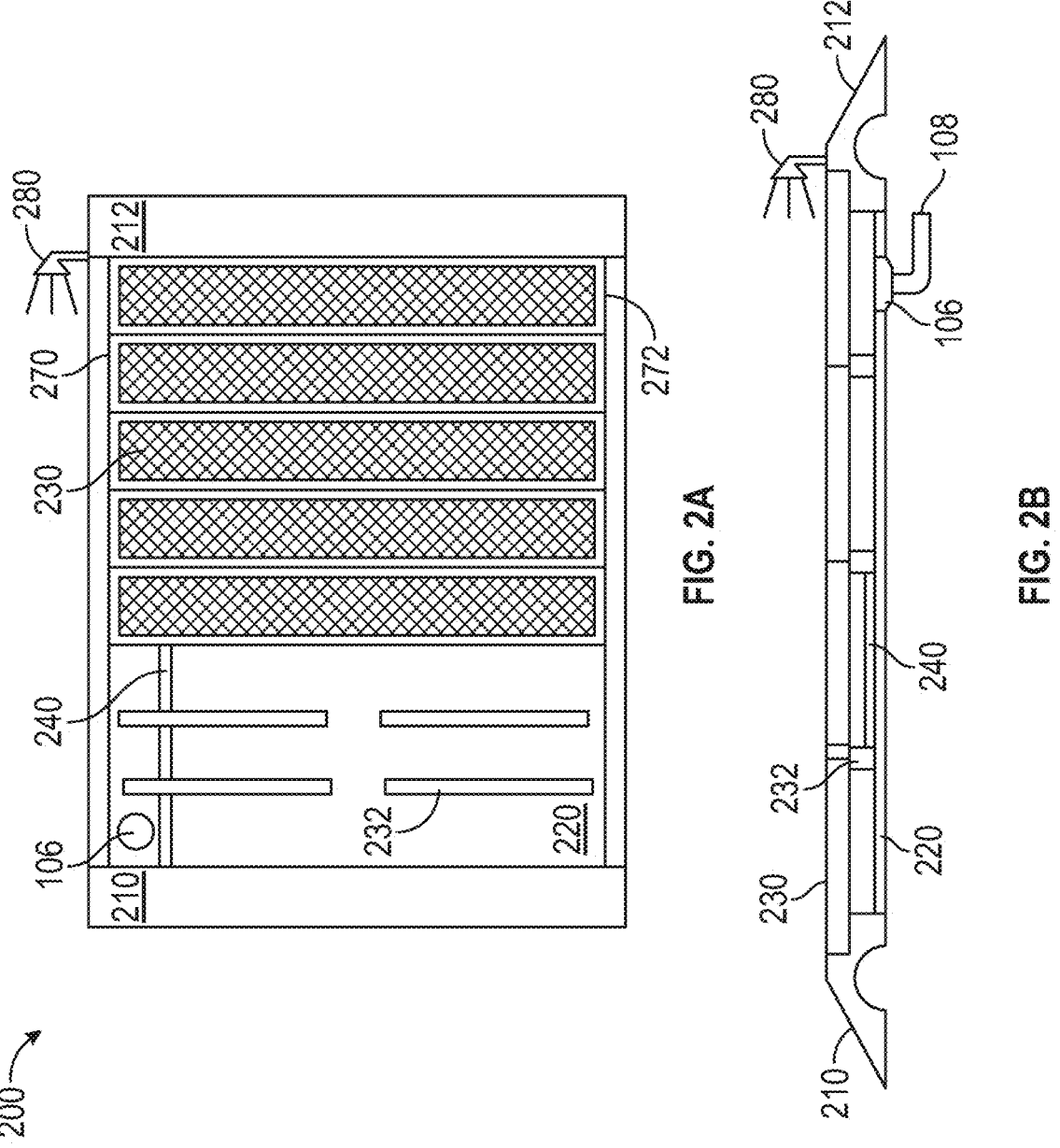
FIG. 2A shows a top view of a washing pad, according to an embodiment.
FIG. 2B shows a side view of the washing pad, according to an embodiment.

Referring to FIGS. 2A and 2B, a washing pad 200 is shown. The washing pad 200 may be the same or similar as the washing pad 104. The washing pad 200 may collect the discharged wash agents for objects being washed. The washing pad 200 may include ramp 210 and ramp 212. The ramps 210 and 212 may be inclined portions of the washing pad 200 that may allow vehicles, pets, or equipment to be easily moved onto the washing pad 200. The ramps 210, 212 may be designed to ease transition to the washing pad 200. The ramps 210, 212 may provide a safe transition to the subsurface for users standing on the washing pad 200, this may prevent falls off the washing pad 200. Although shown on opposing sides, the ramps 210, 212 may be installed on any combination or all of the four sides of the washing pad 200. The number and placement of ramps 210, 212 may be configured based on the requirements of a particular installation.

The objects to be washed may be placed on an upper washing surface of the washing pad 200. The upper washing surface may be formed or constructed from one or more surface grates 230 that may be held in place by one or more support members 232. The surface grates 230 may be formed or constructed to allow for the discharged wash agents to fall through the surface grates 230 into a contained area within the washing pad 200. The contained area may be defined by a lower washing pad base 220, side containment walls 270 and 272, and the entry ramps 210 and 212. The contained area may prevent discharged wash agents from flowing into the local ground water or external environment of the washing pad 200.

In some cases the surface grates may include support members into a single component. The surface grates 230 may be formed integrally and unitarily with the one or more support members 232. The surface grates 230 may be separate from the one or more support members 232. When separate, the surface grates 230 and the one or more support members 232 may be coupled together with a connection device, such as, for example, a fastener, coupling, etc. In some of these cases small structures may also be added to allow for the control of flow of discharged wash agents to the wash capture point 106. The one or more support members 232 may be comprised of a series of small structures that may be configured and adhered to the lower washing pad base 220 to allow for the flow of discharged wash agents to the wash agent capture point 106. The lower washing pad base 220 may have a surface that is sloped or angled downward to facilitate flow of the discharged wash agents to the wash agent capture point 106. Heavy particulates (e.g., higher density than the flow) may be contained via a one or more obstructions 240. The one or more obstructions 240 may be a series of particulate catch obstructions 240 installed at various points where the wash discharge will flow to exit the washing pad 200. The obstructions 240 may include small ridges, baffles, or filtered traps. The obstructions 240 may trap dirt, debris, and other heavy objects. Thus, discharged fluid agents and small or lightweight particulates may flow to the wash agent capture point 106 while heavy particulates are contained within the washing pad 200 preventing them from being sent to reclamation tank 109 with the fluid agents and small or lightweight particulates. The trapped particulates may be removed by removing the surface grates 230 and removing the particles by shovel, vacuum, or other methods. Liquid particulates and lightweight or small particulates (e.g., particulates which will not fall out of the wash agent and will flow with the wash agent) may be evacuated at the wash agent capture point 106 and sent to the reclamation tank for recycling via the return line 108. Although shown in the particular location of FIGS. 2A and 2B, the wash agent capture point 106 may be located in other positions on the washing pad 200 and/or may include more than one wash agent capture point 106. The wash agent capture point 106 may be an opening in the lower washing pad base 220. The wash capture point 106 may also be located next to or near the wash pad for cases where this design provides a better solution for a particular site.

An object sensor 280 may be installed to monitor when objects are on the washing pad 200. The sensor 280 may allow for alerts to be sent when objects are parked on the washing pad 200. This may allow for prevention of objects being left on the washing pad 200 which may prevent the washing system from being blocked from use. This may assist in reducing the downtime of sites that are otherwise unattended. The object sensor may also include a video camera that will allow for remote viewing of the site. In some cases, the washing pad 200 may include side walls extending upward from the upper washing surface. The side walls may contain any over spray of wash agents.

Figure 3:
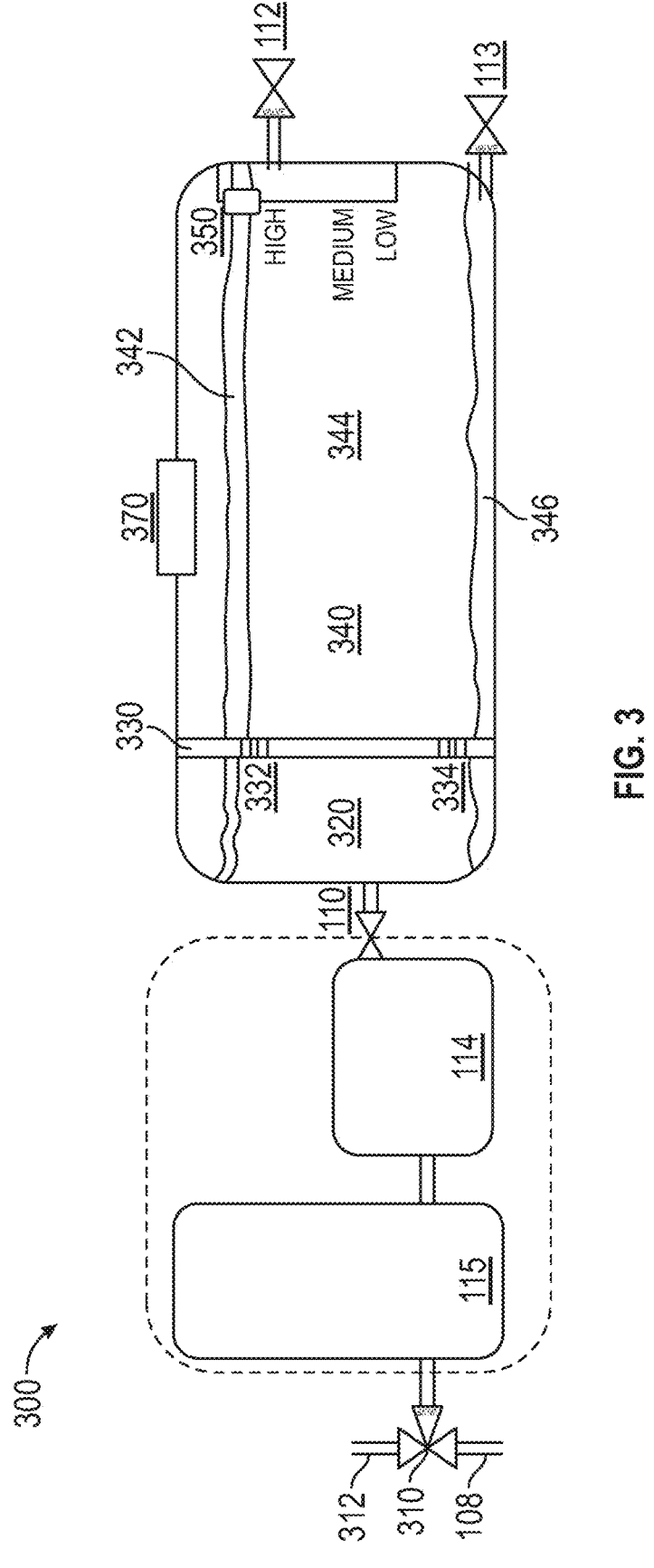
FIG. 3 shows a reclamation tank, according to an embodiment.

FIG. 3 shows a reclamation tank 300 side view. The reclamation tank 300 may be the same or similar as the reclamation tank 109. The reclamation tank 300 may include a tank fill control valve 310 having a clean water supply inlet 312 and a washing agent return line 108. As discussed, the washing agent return line 108 may transfer wash agents collected in the washing pad. The reclamation tank 300 may include a first compartment 320 where fluids are supplied to the reclamation tank 300 from either the clean water supply 312 or from the wash agent return line 108. The materials supplied to the first compartment 320 may be controlled by the agent fill control valve 310. The reclamation tank 300 may include an interior wall or entry separation baffle 330. The baffle 330 may isolate the tank 300 into two compartments: first compartment 320 and second compartment 340. The baffle 330 may include one or more high side access ports 332 and one or more low side access ports 334. The ports 332, 334 may located high and low, respectively, to allow flow of reclaimed agents from the first compartment 320 to flow to the second compartment 340 without causing mixing of the separated components in the second compartment 340. This may allow for a center portion of the second compartment 340 to remain undisturbed (e.g., to high and low ports) and may reduce the mixing or eliminate the mixing in the center portion and/or in the second compartment 340. The access ports 332, 334 may allow flow between the first compartment 320 and the second compartment 340. The baffle 330 may allow for separation of the incoming materials/agents present in first compartment 320. For example, liquids may be allowed to separate in second compartment 340 between first agents 342 representing the agents that have a density lighter than water (e.g., less weight per volume than water) and thus rise in water such as separated oils and other cleaning agents, second agents 344 representing the reusable water, and third agents 346 representing the agents that have a density heavier than water (e.g., more weight per volume than water) and thus sink in water and are separated from the water. The reclamation tank 300 may include a tank level monitor 350 that may allow controls to manage inflow and outflow of reclamation tank 300. This may prevent overfill or improper discharge of agents in the reclamation tank 300. The reclamation tank 300 may include one or more discharge lines. The agent disposal line 112 represents the high side removal line, the disposal line 110 represents the wash agent recycle return line with a secondary wash agent treatment 114 and recycled agent buffer tank 115 (e.g., a line that may flow back into the cleaning system 101), and a disposal line 113 representing the low side agent removal line for heavy particulates removal. A services access point 370 may be provided. The service access point 370 may allow for maintenance and cleaning of the reclamation tank 300.

Figure 4:
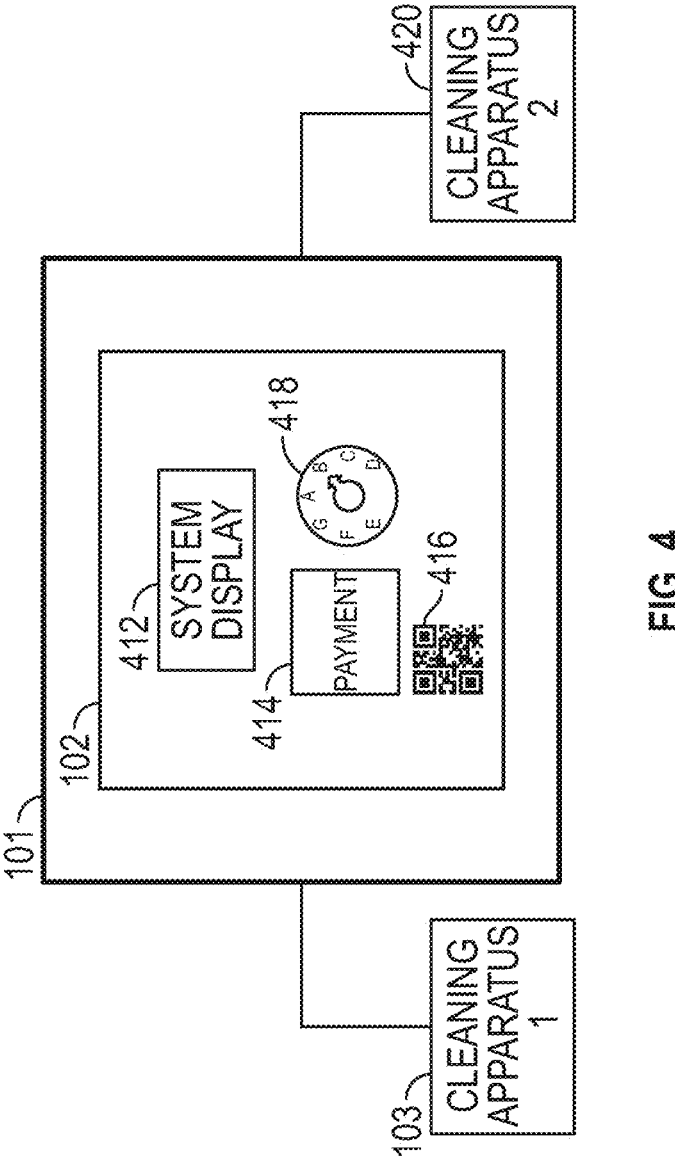
FIG. 4 shows a user access terminal, according to an embodiment.

Referring to FIG. 4 a user access terminal 102 for the cleaning system 101. A user may receive information and instruction via a system display 412 and may be able to make payments via a payment module 414. The payment module 414 may be, for example, a bill or coin payment device, a credit card payment device, or other payment device. A user may access the washing system via their own personal mobile devices via a link such as a QR Code 416 or other mobile device link or mobile application. Users may make selections to the cleaning solution or cleaning apparatus 103 via a cleaning system selection control 418 which may manage one or more cleaning apparatus 103 and 420.

Figure 5:
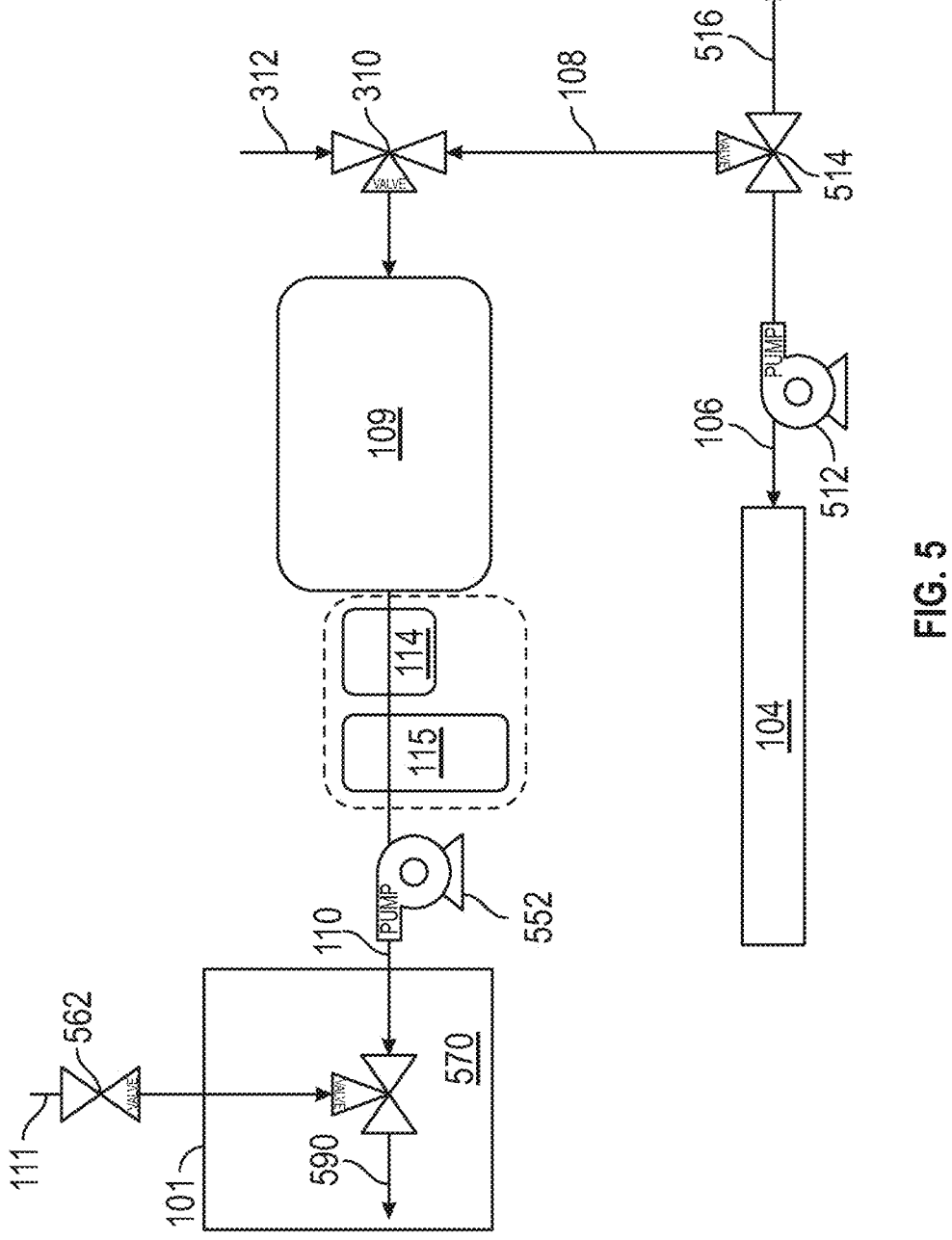
FIG. 5 shows a flow diagram for reclaiming wash agents, according to an embodiment.

FIG. 5 shows a reclamation system flow diagram depicting a system to control the management of fluids in the washing system of the present disclosure. Wash agents may flow from the washing pad 104 to the wash agent capture point 106 where captured wash agents are removed from the washing pad 104. The wash agents may be pumped via a pump 512 (although other flow control devices are considered) that may transition the captured wash agents to a control valve 514. The control valve 514 may control the direction to which the reclaimed agents are sent. For example, the control valve 514 may direct fluids to conduit 516 to be discharged from the system to either a second holding tank or to an environmentally safe location such as a sanitary sewer and/or to wash agent return line 108 to be sent to the reclamation tank 109. As mentioned previously, the reclamation tank 109 may include a clean water supply inlet 312. A reclamation tank fill valve 310 may control flow from the clean water supply inlet 312 and the wash agent return line 108 into the reclamation tank 109. When exiting the reclamation tank 109, fluids to be returned to the cleaning system 101 may travel through a filter 550. The fluids to be returned to the cleaning system 101 may be pumped via a recycled return pump 552 along the recycle return line 110 and may supply the recycled water and agents back to the cleaning system 101 for re-use. As discussed previously, a fresh water inlet 111 to the cleaning system 101 may be controlled with a fresh water inlet control valve 562 to the cleaning system 101. A control valve system 570 may manage the fresh water 111 and the recycled water 110 run through a secondary wash agent treatment 114 and recycled agent buffer tank 115. The flow of wash agent that ultimately enters the washing system 101 is shown at 590.

Figure 6:
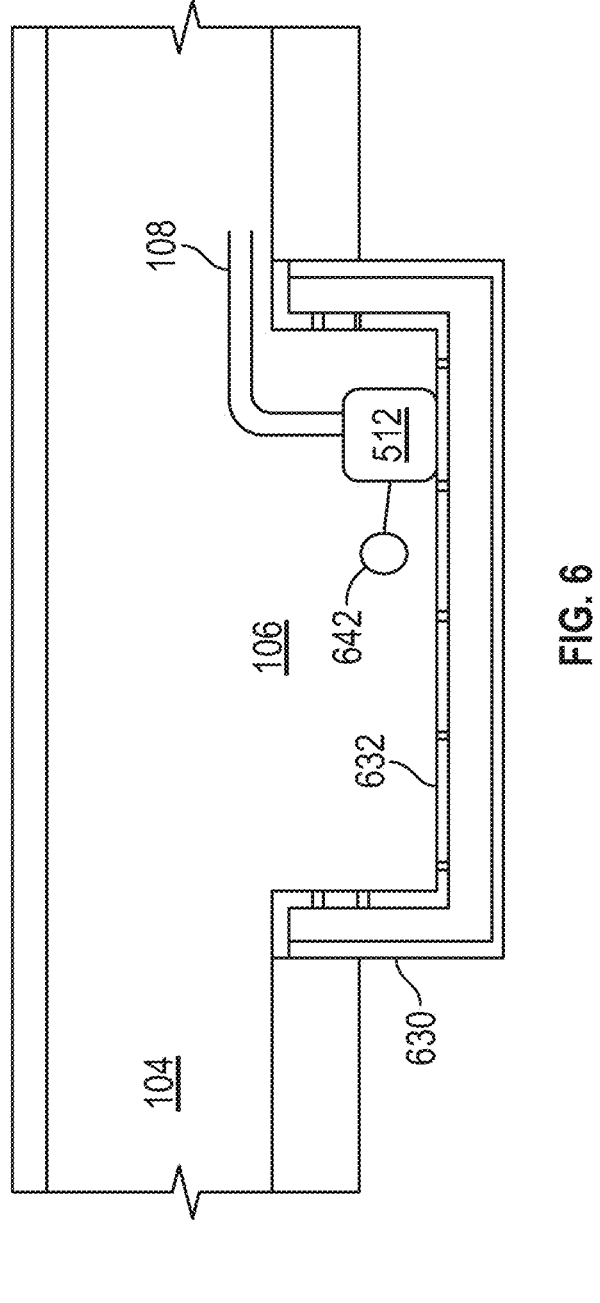
FIG. 6 shows a washing pad return sump, according to an embodiment.

FIG. 6 shows a washing pad return sump 600 or the point where fluids from the washing pad 104 are collected to be evacuated from the washing pad 104. In an exemplary embodiment, agents are collected at a washing pad evacuation point 106. The washing pad evacuation point 106 may be a pit below the grade level of the washing pad 104 to accumulate used wash agents. The sump may be located in a secondary location such as, for example, in a box or similar container. For locations where going below the existing ground surface is not possible or not feasible, the return sump may be located at a secondary location where the untreated wash agents are pumped into the sump as a first stage of removal. An outer sump vessel 634 may be contained by an outer casing 630 and an inner casing 632. The inner casing 632 may be porous and/or may be provided with ports to allow flow between an inner sump vessel 636 and the outer sump vessel 634. Agents may flow into the primary sump area or inner sump vessel 636 with heavier particulates allowed to flow into the outer area or outer sump vessel 634 for proper removal as needed. A pump 512 and a sump level monitor 642 may be provided. The pump 512 may transition accumulated used liquid wash agents out of the washing pad 104 via the wash agent return line 108. The inner casing 632 may be removable to provide access to any heavy particulates that accumulate in the outer sump vessel 634. The sump level monitor 642 may monitor the level of fluid in the sump 600.

Figure 7:
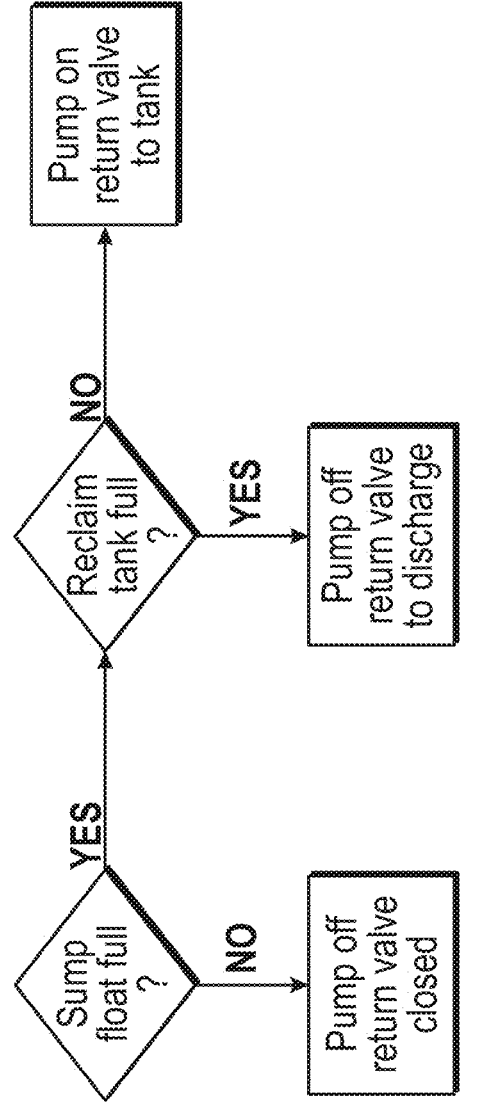
FIG. 7 shows a logic diagram and chart for a return sump, according to an embodiment.

FIG. 7 represents the control logic managing the flow of captured used wash agents exiting the washing pad 104. The sump pump 512 and wash pad return valve 514 are controlled to manage the used wash agent transition through return 516 and 108 based on the conditions present in the reclamation tank level monitor 350 and the sump level monitor 642.

Any of the pumps described herein may be replaced with gravity flow. That is, the components and conduits may be arranged such that gravity causes the wash agent to flow through the system.

Figure 8:
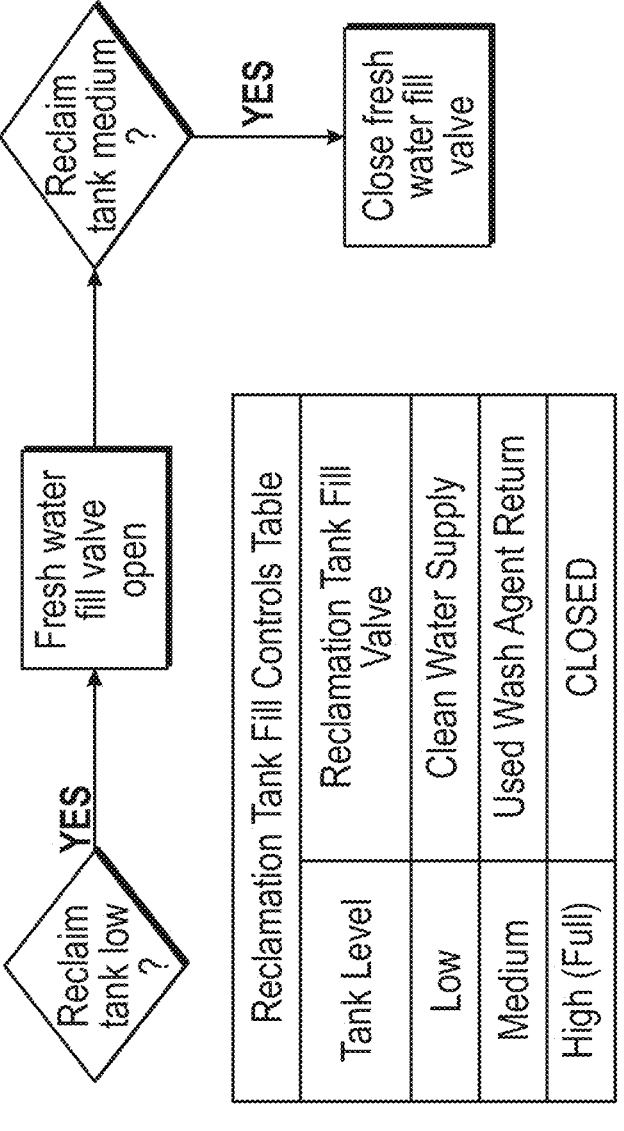
FIG. 8 shows a logic diagram and chart for a reclamation tank refill, according to an embodiment.

FIG. 8 represents the control logic for the filling of the reclamation tank 109 controlled by the reclamation fill tank valve 310. The tank will be filled according to the readings from the tank level monitor 350. When the monitor reads the tank as low on fill, it will allow clean water to be added from the clean water supply line 312. When the monitor reads the tank as at high fill it will close the supply valve 310 preventing more agents from being added. The system may also be shut down from further use if there is not another way to safely discharge the used wash agents from the washing pad 104. All other levels will allow used wash agents to be added to the reclamation tank 109 from the washing pad 104 via the wash agent reclaim line 108.

Figure 9:
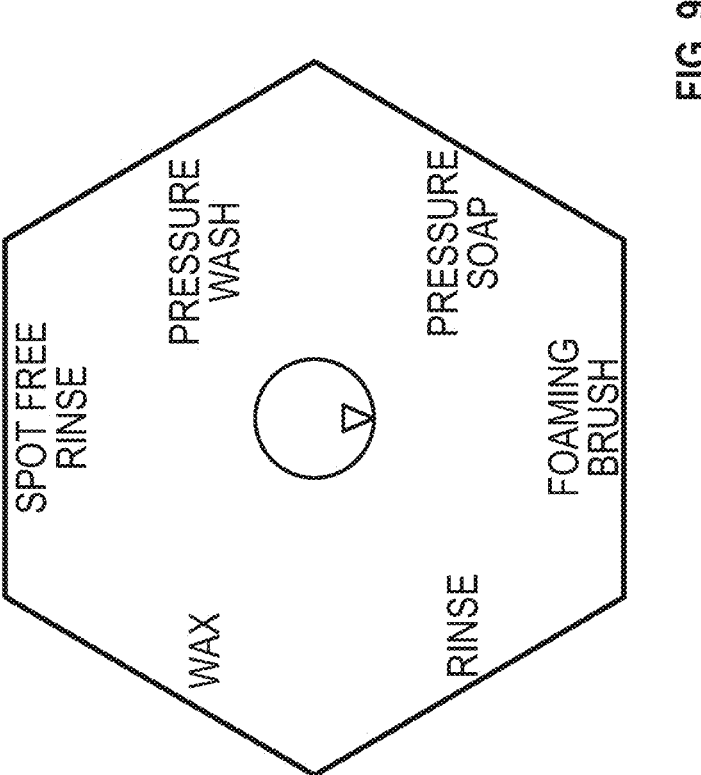
FIG. 9 shows a logic diagram and chart for use of fresh and reclaimed water for a cleaning system, according to an embodiment.

FIG. 9 represents the controls for managing the source of water for the cleaning system 101 for the various user functions selected via the wash system user access terminal 102 and the user cleaning system selection control 418. System cleaning agent control valve 570 will manage the source of water based on the user selection with fresh water used for rinse functions supplied via the fresh agent supply line 111 and recycled wash agent water used for wash cycles supplied from the recycle return line 110. For systems where the secondary wash agent treatment 114 is used, the cleaning system can be programmed to allow for reclaimed agents to be the source for Rinse, Wax, Spot Free selections, or any combination thereof.

The washing system of the present disclosure may include a secondary filtration system will purify the recycled water to remove any remaining impurities. A buffer tank may be placed after the secondary filtration system to allow for holding of purified water for reuse by the cleaning system as demanded.

The washing system of the present disclosure recognizes that the current wash operations either require substantial infrastructures or allow for unmitigated discharge of contaminants to our ground waters. The costs to build systems that appropriately contain and manage wash contaminants using current methods makes providing these systems to small businesses or home communities unfeasible. The present disclosure represents a portable containment vessel with systems to capture and manage wash agents and contaminants offers vast opportunities to provide ecologically friendly wash systems where no such product exists today.

The present disclosure provides a washing pad and controls to manage the captured used agents in the washing pad. The present disclosure provides a washing pad that may be added to an existing surface to capture used wash agents to replace the current method of building a drainage system. The goal is to create a system that will not require a sanitary sewer discharge.

The present disclosure represents a washing system that is modular, portable, and built to suit the particular use or users needs. The washing system may be built on site to desired specifications. The present disclosure represents a washing system that may contain was run off within the system to prevent discharge to the environment. Materials that may be re-used may be recycled through the system for use in another wash cycle. Materials that are waste, may be discharged to a container (e.g., the outer sump area or the reclamation tank or a discharge line) for proper disposal thereof.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A washing system comprising:
   a washing pad;
   a reclamation tank having a baffle separating a first compartment and a second compartment of the reclamation tank, the baffle including a first port and a second port, the first port and the second port being disposed in the baffle at different heights of the reclamation tank and configured to discharge separated flows between the first compartment and the second compartment; and
   a cleaning system and a cleaning apparatus in fluid communication with the cleaning system,
   wherein the washing pad and the baffle are configured to filter out waste agents from a flow of used wash agents,
   wherein the reclamation tank is configured to transfer waste agents from the flow of used wash agents to a disposal site and to transfer reusable agents from the flow of used wash agents to an inlet on the cleaning system, and
   wherein the washing system is portable.

2. The washing system of claim 1, wherein the washing pad further comprises:
   an upper washing surface formed of one or more surface grates supported by one or more support members;
   one or more ramps adapted to allow access to the upper washing surface;
   a contained area bounded by a lower washing pad base, side containment walls, and the one or more ramps;
   one or more obstructions configured to filter out particles; and
   a wash agent capture point configured to transfer the flow of used wash agents from the washing pad to the reclamation tank.

3. The washing system of claim 2, wherein the upper washing surface, via the one or more surface grates, is configured to allow the flow of used wash agents and any collected particulates into the contained area of the washing pad.

4. The washing system of claim 1, wherein the washing pad further comprises:
   a washing pad inlet configured to allow flow of new wash agents through the washing pad; and
   a washing pad outlet configured to allow flow of used wash agents from the washing pad to the reclamation tank.

5. The washing system of claim 1, wherein the reclamation tank further comprises:
   the baffle having the first port including one or more high side access ports and the second port including one or more low side access ports; and
   a plurality of outlets, the plurality of outlets configured to discharge separated flows from the flow of used wash agents.

6. The washing system of claim 5, wherein the baffle is configured to filter lighter density particulates through the one or more high side access ports and higher density particulates through the one or more low side access ports.

7. The washing system of claim 5, wherein the reclamation tank further comprises:
   a reclamation tank inlet configured to supply a clean water flow and the flow of used wash agents to the first compartment;
   a first reclamation tank outlet configured to allow a flow of high side wash agents for disposal;
   a second reclamation tank outlet configured to allow a flow of low side wash agents for disposal; and
   a third reclamation tank outlet configured to allow a flow of reusable wash agents from the second compartment to the cleaning system.

8. The washing system of claim 1, further comprising a secondary filtration system configured to purify the recycled water to remove impurities.

9. The washing system of claim 8, further comprising a buffer tank placed after the secondary filtration system to allow for holding of purified water for reuse by the cleaning system.

10. The washing system of claim 1, wherein the cleaning system further comprises:

a user interface having a payment module and a system display.

11. The washing system of claim 1, wherein the cleaning system further comprises:

a cleaning system inlet configured to allow flow of new wash agents to the cleaning apparatus; and a cleaning system outlet formed in the cleaning apparatus and configured to discharge the flow of new wash agents.

12. The washing system of claim 11, wherein the flow of new wash agents comprises a flow of fresh water, new cleaning agents, and reused cleaning agents from the reclamation tank.

13. The washing system of claim 1, wherein the cleaning apparatus further comprises a spray wand, a brush, a foaming brush, a squeegee, other cleaning device or combinations thereof.

14. The washing system of claim 1, further comprising one or more control valves configured to control flow between the washing pad, the reclamation tank, and the cleaning system.

15. The washing system of claim 1, wherein the reusable agents include water.

16. A method of recycling cleaning agents, the method comprising:

providing a first flow from a cleaning system to a cleaning apparatus, the first flow comprising new cleaning agents and fresh water;

discharging the first flow from the cleaning apparatus onto an object to be cleaned;

collecting the first flow in a washing pad;

discharging a second flow from the washing pad, the second flow comprising the first flow after washing the object to be cleaned;

providing the second flow to a reclamation tank having a baffle separating a first compartment and a second compartment of the reclamation tank, the baffle including a first port and a second port, the first port and the second port being disposed in the baffle at different heights of the reclamation tank and configured to discharge separated flows between the first compartment and the second compartment;

filtering the second flow in the reclamation tank through the first compartment and the second compartment to produce a third flow from the second compartment;

discharging the third flow form the reclamation tank; and reusing the third flow from the reclamation tank in the cleaning system.

17. The method of claim 16, wherein the first flow further comprises the third flow.

18. The method of claim 16, wherein the washing pad removes heavy particulates such that the second flow provided to the reclamation tank is a filtered flow.

19. The method of claim 16, wherein the second flow is filtered into the third flow, a fourth flow, and a fifth flow, wherein the fourth flow comprises high side waste agents and the fifth flow comprises low side waste agents, and wherein the high side waste agents are of lower density than the low side waste agents.

20. The method of claim 16, further comprising a first pump to move the second flow from the washing pad to the reclamation tank and a second pump to move the third flow from the reclamation tank to the cleaning system.

21. The method of claim 16, further comprising one or more control valves configured to control flow between the washing pad, the reclamation tank, and the cleaning system.

* * * * *